United States Patent
Ito et al.

(10) Patent No.: US 6,331,699 B1
(45) Date of Patent: Dec. 18, 2001

(54) MICROWAVE HEATING APPARATUS REQUIRING REDUCED POWER IN A STANDBY STATE

(75) Inventors: Kohei Ito, Izumi; Hideaki Otani, Tondabayashi; Tomoko Ota, Neyagawa; Sakae Kondou, Kashiwara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/373,082

(22) Filed: Aug. 11, 1999

(30) Foreign Application Priority Data

Nov. 19, 1998 (JP) .................................. 10-328953
Nov. 25, 1998 (JP) .................................. 10-333707

(51) Int. Cl.$^7$ ................................................ H05B 6/66
(52) U.S. Cl. ......................... 219/715; 219/720; 219/722; 219/724
(58) Field of Search ..................... 219/715, 702, 219/704, 714, 718, 719, 720, 721, 722, 724, 739

(56) References Cited

U.S. PATENT DOCUMENTS

| | | | |
|---|---|---|---|
| 3,876,956 | * 4/1975 | Levinson | 331/71 |
| 3,961,152 | * 6/1976 | Staats | 219/715 |
| 4,296,296 | * 10/1981 | Eichelberger et al. | 219/715 |
| 4,341,409 | * 7/1982 | Sakoda | 219/724 |
| 4,431,893 | * 2/1984 | Levie | 219/702 |
| 4,533,810 | * 8/1985 | Harmon et al. | 219/721 |
| 4,542,269 | * 9/1985 | Sakoda | 219/724 |
| 4,672,160 | * 6/1987 | Katoh | 219/724 |
| 5,005,123 | * 4/1991 | Mierzwinski | 364/400 |
| 5,124,518 | * 6/1992 | Lee | 219/718 |
| 5,258,595 | * 11/1993 | Tanaka | 219/702 |
| 5,321,235 | * 6/1994 | Makino et al. | 219/716 |
| 5,571,439 | * 11/1996 | Daley et al. | 219/716 |
| 5,653,906 | * 8/1997 | Fowler et al. | 219/716 |

FOREIGN PATENT DOCUMENTS

| | | |
|---|---|---|
| A6-349139 | 12/1994 | (JP) . |
| A7-217906 | 8/1995 | (JP) . |
| A10-261483 | 9/1998 | (JP) . |

* cited by examiner

Primary Examiner—Tu Ba Hoang (57) ABSTRACT

A microwave heating apparatus operates in either a first mode or a second mode, that allow different amounts of electric power to be supplied to a load and a control circuit for driving and controlling the load. The voltage applied to a primary coil of a transformer is lower in the second mode than in the first mode. In another apparatus, no electric power is supplied to a control circuit for driving and controlling a heating member and other circuits when the apparatus is in a standby state. However, when the user operates an operation member for opening the door of a heating chamber, electric power is supplied.

16 Claims, 10 Drawing Sheets

MICROWAVE HEATING APPARATUS REQUIRING REDUCED POWER IN A STANDBY STATE

BACKGROUND OF THE INVENTION

1. Field of the Invention

The present invention relates to a microwave heating apparatus that consumes less electric power in a standby state.

2. Description of the Prior Art

Figure 1:
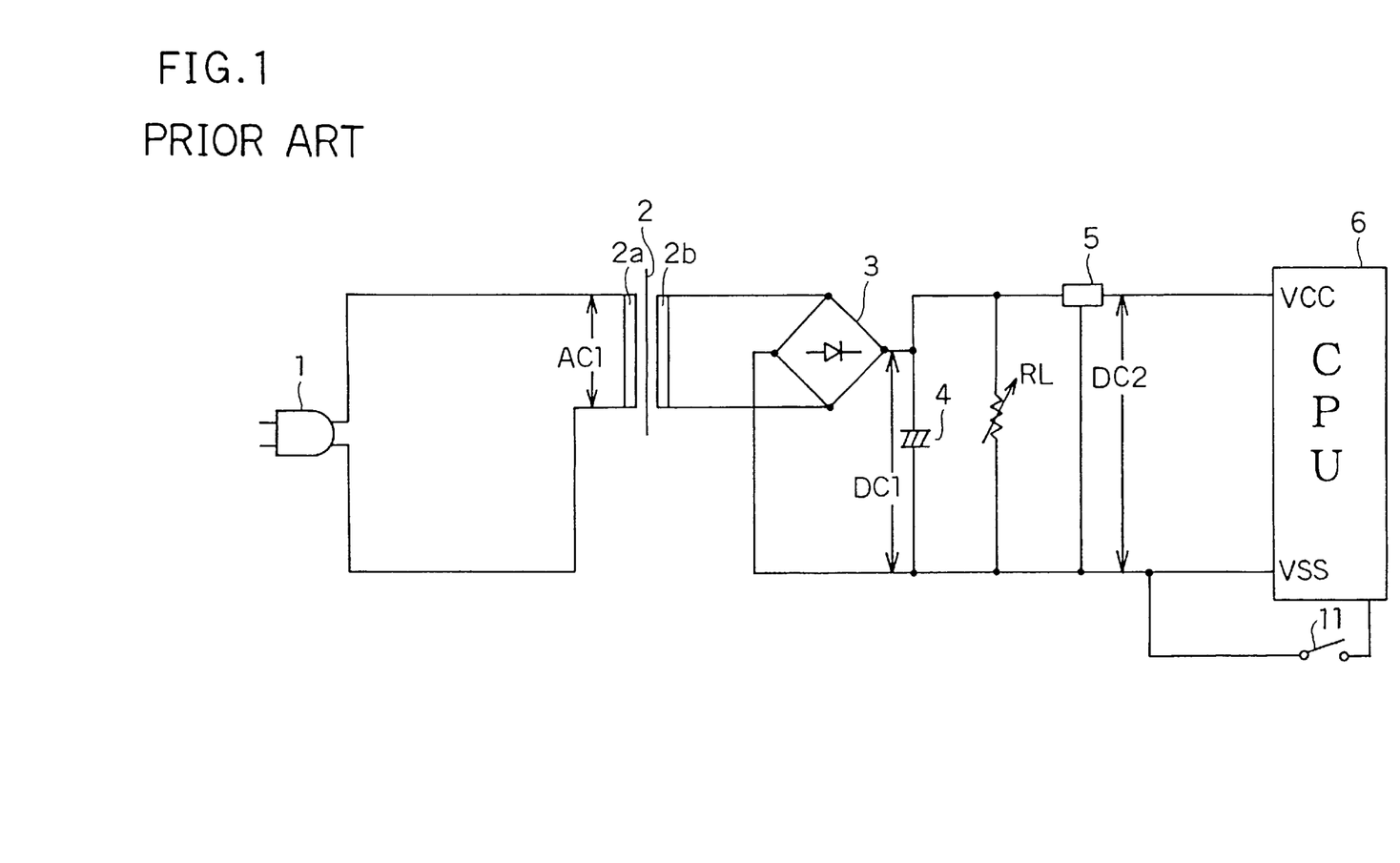
FIG. 1 is an electric circuit diagram of a conventional microwave heating apparatus.

FIG. 1 shows an example of the electric circuit diagram of a conventional microwave heating apparatus. This microwave heating apparatus has a plug 1 that is connected to a commercial alternating-current electric power, a step-down transformer 2 for stepping down the voltage of the commercial electric power taken in via the plug 1, a full-wave rectification circuit 3, a smoothing capacitor 4, load circuits RL, a three-terminal voltage regulator 5, and a CPU 6.

The CPU 6, by monitoring the state of a switch 11, detects a door being opened or closed, so that, if the door is opened in the middle of heating operation, the heating operation will be stopped. Moreover, the CPU 6 controls the load circuits RL. The load circuits RL include, for example, various sensors such as an AH (absolute humidity) sensor and a weight sensor, and a relay circuit. The relay circuit controls supply of electric power to a magnetron.

The step-down transformer 2 has a primary coil 2a connected to the plug 1, and has a secondary coil 2b connected to input terminals of the full-wave rectification circuit 3. The smoothing capacitor 4 has one end connected to a high-voltage-side output terminal of the full-wave rectification circuit 3, and has the other end connected to a low-voltage-side output terminal thereof. For example, in Japan, a source voltage of 100 V fed in via the plug 1 is applied, as a voltage AC1, to the primary coil 2a of the step-down transformer 2 so as to induce a stepped-down voltage across the secondary coil 2b.

This voltage appearing across the secondary coil 2b is subjected to full-wave rectification by the full-wave rectification circuit 3 and then to smoothing by the capacitor 4 so as to be made into a direct-current voltage DC1 of about 18 V. This voltage DC1 is used to drive the load circuits RL. The CPU 6 receives a direct-current voltage DC2 that is regulated by the three-terminal voltage regulator 5 so as to have about 5 V. This voltage DC2 is applied, on its high-voltage and low-voltage sides, to the terminals VCC and VSS, respectively, of the CPU 6.

Having a circuit configuration as described above, this microwave heating apparatus has the following disadvantage. Even when the microwave heating apparatus is in a standby state, i.e. even when it is not in operation for cooking, the same voltage as when it is in operation is applied through the step-down transformer 2 to the load circuits 5. As a result, electric power of about 2 W is unnecessarily consumed as iron loss, copper loss, and the like as well as by the load circuits including the various sensors and the relay circuit.

As an improvement to such a microwave heating apparatus that unnecessarily consumes electric power in a standby state, Japanese Laid-Open Patent Application No. H7-217906 proposes a microwave heating apparatus that is so configured as to consume less electric power in a standby state.

Figure 2:
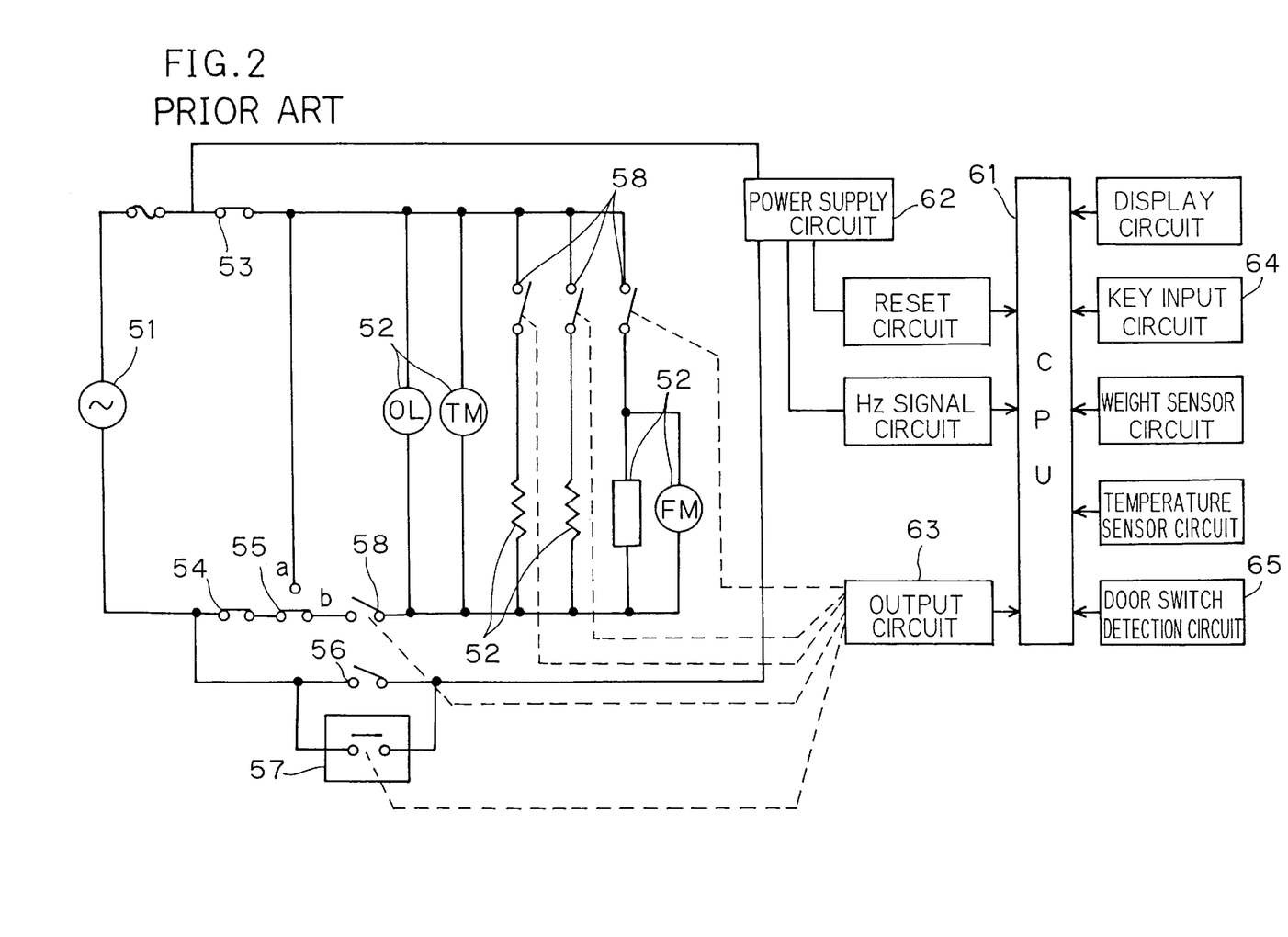
FIG. 2 is a diagram showing a circuit configuration according to prior art.

FIG. 2 shows the circuit configuration of this microwave heating apparatus. The microwave heating apparatus operates from a power source 51, and has loads 52 such as a heating member and a motor, main door switches 53 and 54 that are turned off or on as a door is opened or closed, a monitor switch 55, a door switch 56 that is turned on or off as the door is opened or closed, and relay switches 57 and 58.

The microwave heating apparatus also has a CPU 61 that serves as a data processing device, and a power supply circuit 62 for producing direct-current electric power on which the CPU 61 and other circuits operate. The microwave heating apparatus further has an output circuit 63 for driving the above-mentioned relay switches 57 and 58, a key input circuit 64 for allowing setting of a cooking program for heating operation and entry of an instruction for starting heating operation, and a door switch detection circuit 65 for detecting the open/closed state of the door; these three circuits are driven and controlled under the control of the CPU 61.

FIG. 2 shows a state in which the door is closed. In this state, the main door switches 53 and 54 are on, the door switch 56 is off, and the monitor switch 55 is in the terminal "b" position. Moreover, the relay switches 57 and 58 are off, and thus no electric power is supplied to the loads 52, the CPU 61, or other circuits.

When the door is opened from this state, the main switches 53 and 54 are turned off, and the monitor switch 55 is brought into the terminal "a" position. Moreover, the door switch 56 is turned on, and thus electric power starts being supplied only to the CPU 61. The CPU 61, when it starts receiving electric power through the power supply circuit 62, first turns on the relay switch 57 through the output circuit 63. Accordingly, the CPU 61 continues receiving electric power even when the door is closed next time and the door switch 56 is turned off.

The CPU 61, at the same time as it turns on the relay switch 57, sets a period of time to be counted by a timer, so that, when the once opened door is closed again, the timer starts counting the period of time. Unless, in the meantime, a key input signal is obtained from the key input circuit 64 or a door open/close signal is obtained from the door switch detection circuit 65, the CPU 61 turns off the relay switch 57 when the timer finishes counting the period of time. Accordingly, when no heating operation is taking place, supply of electric power to the CPU 61 is shut off securely, and thus no electric power is consumed in a standby state.

However, this microwave heating apparatus has its own disadvantage. For example, some of its functions require energizing of the CPU 61 but do not necessarily require heating operation, such as the function of displaying on a display unit, for confirmation, cooking conditions such as heating power and heating time under which heating operation is to be performed or cooking recipe data indicating a cooking method and appropriate heating conditions, or the function of executing a cooking menu selection program. Even to perform such a function, it is necessary to energize the CPU 61 first by performing an extra step of opening the door once.

SUMMARY OF THE INVENTION

An object of the present invention is to provide a microwave heating apparatus that consumes less electric power in a standby state.

To achieve the above object, according to one aspect of the present invention, a microwave heating apparatus is provided with: a load; a control circuit for controlling and driving the load; a power source for supplying electric power to the load and the control circuit; and a transformer for stepping down the voltage of the electric power supplied from the power source to the load and the control circuit. Here, the microwave heating apparatus operates in one of two modes, namely a first mode and a second mode, that allow different amounts of electric power to be supplied to the load and the control circuit, and the voltage applied to the primary coil of the transformer is lower in the second mode than in the first mode.

According to another aspect of the present invention, a microwave heating apparatus is provided with: a heating member; a control circuit for driving and controlling the heating member; a power source for supplying electric power to the heating member and the control circuit; a door provided so as to shut a heating chamber in which to place food; and an operation member for opening the door when the door is in a closed state. Here, when the user operates the operation member, electric power starts being supplied from the power source to the control circuit.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, embodiments of the present invention will be described with reference to the accompanying drawings.

Figure 3:
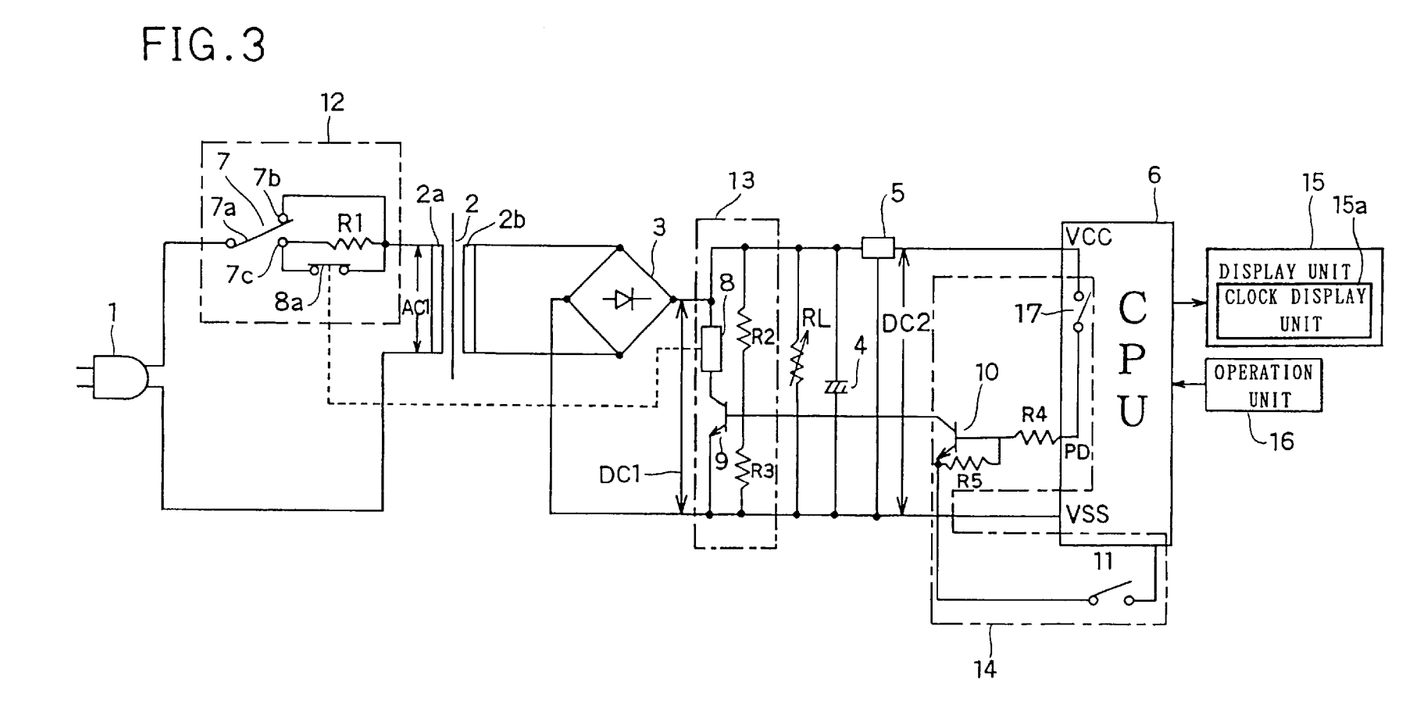
FIG. 3 is an electric circuit diagram of a first embodiment of the invention.

FIG. 3 is an electric circuit diagram of a microwave heating apparatus of a first embodiment of the present invention. This microwave heating apparatus operates in one of two modes that allow different amounts of electric power to be supplied to load circuits RL. One of the two modes is a normal mode, in which electric power sufficient to allow operation of the apparatus is supplied to the load circuits RL, and the other is a power-saving mode, which is established when the load circuits RL are in a standby state and in which less electric power is supplied to the load circuits RL than in the normal mode.

As compared with the electric circuitry of the conventional microwave heating apparatus shown in FIG. 1, the electric circuitry of the microwave heating apparatus of this embodiment additionally has a mode switching circuit 12, a mode switching signal generating circuit 13, a mode switching judgment circuit 14, a display unit 15, and an operation unit 16. No description will be given of such elements of this embodiment as are found also in the electric circuit diagram shown in FIG. 1.

The mode switching circuit 12 is composed of a switch 7, a resistor R1, and a relay switch 8a. The switch 7, which is of a single-throw, two-pole, three-terminal type, has a moving terminal 7a connected to one terminal of a plug 1 that is connected to commercial alternating-current electric power. According as the door (not shown) of the microwave heating apparatus is opened or closed, the switch 7 switches the connection of the moving terminal 7a between fixed terminals 7b or 7c thereof; specifically, when the door is open, the moving terminal 7a is connected to the fixed terminal 7b and, when the door is closed, the moving terminal 7a is connected to the fixed terminal 7c. FIG. 3 shows a state in which the door is open.

The fixed terminal 7b is connected directly to one terminal of the primary coil 2a of the step-down transformer 2, and the fixed terminal 7c is connected through the resistor R1 and the relay switch 8a, which are connected parallel to each other, to the same terminal of the primary coil 2a. The other terminal of the primary coil 2a of the step-down transformer 2 is connected to the other terminal of the plug 1. The on/off state of the relay switch 8a is switched in accordance with whether a relay coil 8 (described later) is energized or not.

When the door is opened and the moving terminal 7a is connected to the fixed terminal 7b, a voltage AC1 of 100 V is continuously applied to the primary coil 2a of the step-down transformer 2. When the door is closed and the moving terminal 7a is connected to the fixed terminal 7c, the voltage AC1 applied to the primary coil 2a of the stepdown transformer 2 is 100 V if the relay switch 8a is on; however, if the relay switch 8a is off, the voltage AC1 is 50 V as a result of a voltage drop across the resistor R1.

When the voltage AC1 is 100 V, a voltage DC1 of about 18 V is obtained after full-wave rectification; when the voltage AC1 is 50 V, the voltage DC1 is about 9 V. When the voltage DC1 is 18 V, the load circuits RL are supplied with electric power sufficient for their operation. This is the normal mode. By contrast, when the voltage DC1 is 9 V, the power-saving mode is established. Note that, even though the voltage DC1 varies, the three-terminal voltage regulator 5 keeps the voltage DC2 fed to the CPU 6 constantly at 5 V. Accordingly, the voltage difference between the input and output of the three-terminal voltage regulator 5 is smaller in the power-saving mode, in which the voltage DC1 is 9 V.

The display unit 15 includes a heating condition display unit for displaying heating conditions and a clock display unit 15a for displaying the current time. The user operates the operation unit 16 to enter heating conditions. The CPU 6 receives signals fed from the operation unit 16, and controls the display unit 15. The display unit 15 and the operation unit 16 receive electric power through the CPU 6. Accordingly, a constant voltage is applied to the display unit 15 and the operation unit 16, just as to the CPU 6, regardless of the mode. Thus, the clock display unit 15a maintains display of the current time all the time.

The mode switching signal generating circuit 13 is composed of a relay coil 8, an npn-type transistor 9, and resistors R2 and R3. One end of the relay coil 8 is connected to the high-voltage-side output terminal of the full-wave rectification circuit 3, and the other end is connected to the collector of the transistor 9. The emitter of the transistor 9 is connected to the low-voltage-side output terminal of the full-wave rectification circuit 3. The resistors R2 and R3 are connected in series, and the node between them is connected to the base of the transistor 9.

Thus, when the transistor 9 is on, a current flows through the relay coil 8, and, when the transistor 9 is off, no current flows through the relay coil 8. While a current is flowing through the relay coil 8, the relay switch 8a remains on; while no current is flowing through the relay coil 8, the relay switch 8a remains off. When the door is opened, the transistor 9 is turned on by the voltage DC1, and thus a current flows through the relay coil 8, turning the relay switch 8a on. However, in this case, in the switch 7, the moving terminal 7a is connected to the fixed terminal 7b, and thus the normal mode is established regardless of the on/off state of the relay switch 8a.

The mode switching judgment circuit 14 is composed of switches 11 and 17, an npn-type transistor 10, and resistors R4 and R5. The transistor 10 has its base connected through the resistor R4 to a terminal PD of the CPU 6, has its collector connected to the base of the transistor 9, and has its emitter connected through the switch 11 to the CPU 6. Moreover, the base and emitter of the transistor 10 are connected together through the resistor R5.

The on/off state of the switch 11 is switched according as the door of the microwave heating apparatus is opened or closed; specifically, when the door is closed, the switch 11 is turned on. The state of the switch 11 is detected by the CPU 6. When the switch 11 is turned on, the CPU 6 recognizes it and outputs a signal via its terminal PD to turn off the transistor 10. When the transistor 10 is off, the transistor 9 remains on. Thus, when the door is closed, in the switch 7, the moving terminal 7a is connected to the fixed terminal 7c, but instead the relay switch 8a is turned on. Accordingly, the state in which a voltage of 100 V is continuously applied as AC1 is maintained. Thus, the normal mode is established, allowing the load circuits RL to perform their normal operation.

The CPU 6 incorporates a timer. This timer starts counting time at the same time as the door is closed. Inside the CPU 6, a predetermined period of time after the timer starts counting time, a switch 17 is turned on and thereby the timer is reset. If any operation is performed in an operation unit 16 while the timer is counting time, the timer is made to stop counting time and is reset.

The switch 17 is a switch that connects the terminals VCC and PD together inside the CPU 6. When the switch 17 is turned on, a signal that causes the transistor 10 to be turned on is fed out via the terminal PD. When the transistor 10 is turned on, the transistor 9 is turned off, and thus no current is fed to the relay coil 8 any longer. Accordingly, the relay switch 8a is turned off, and a voltage drop occurs across the resistor R1, making the voltage AC1 lower. Thus, the power-saving mode is established. The above-mentioned predetermined period of time is determined in such a way as to allow the user sufficient time to start the next operation before the power-saving mode is established when cooking is performed continuously.

Now, the operation of the microwave heating apparatus of this embodiment, which is configured as described above, will be described with reference to FIG. 4, which shows the control flow of the CPU 6. When the user inserts the plug 1 into an outlet of commercial alternating-current electric power, the CPU 6 is energized and starts control. First, in step #5, whether the door is open or not is checked. This check is achieved by checking the state of the switch 11. Specifically, if the switch 11 is on, the door is recognized as closed, and, if the switch 11 is off, the door is recognized as open.

Figure 4:
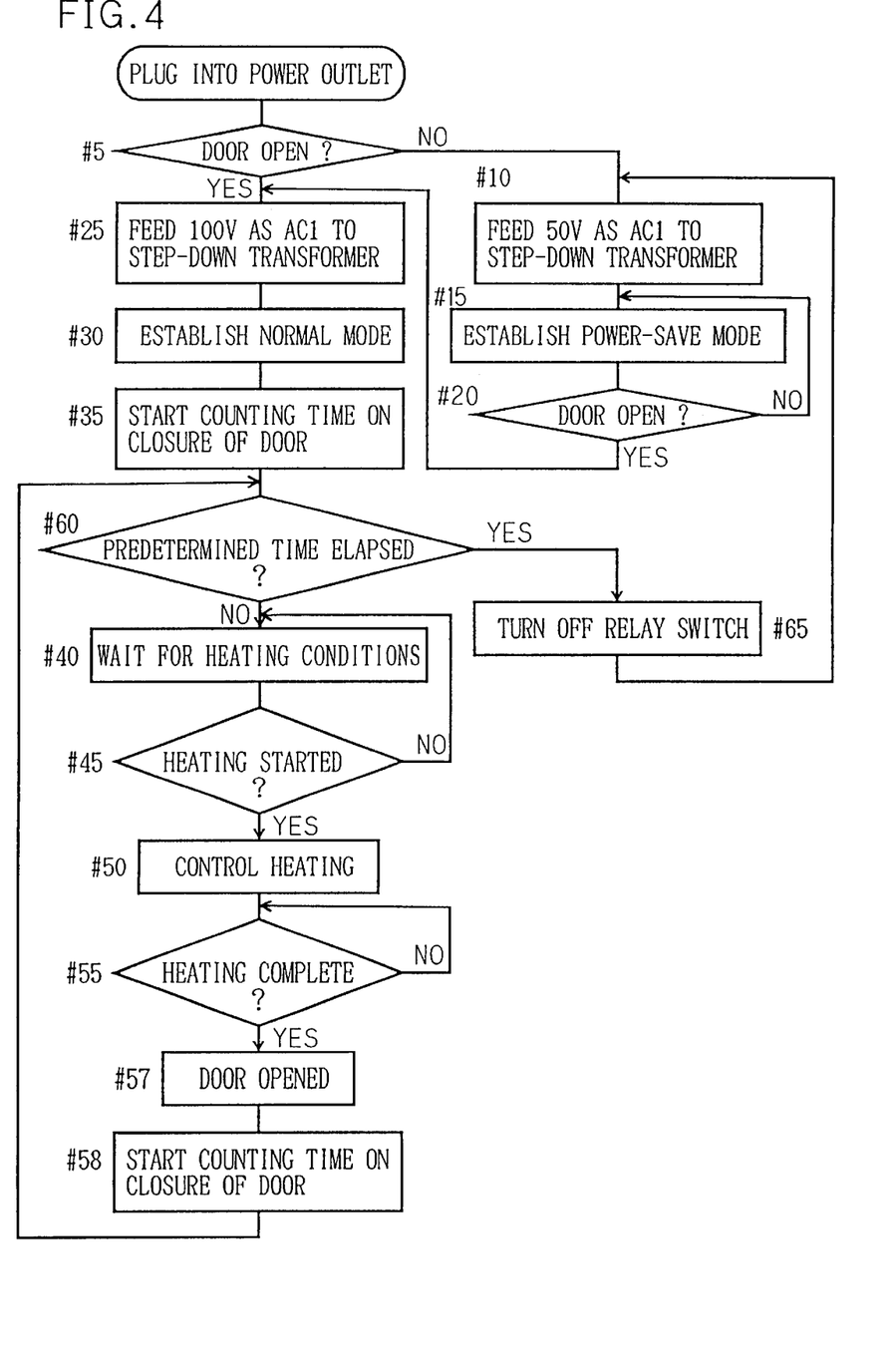
FIG. 4 is a diagram showing the control flow of the CPU in the first embodiment.

If the door is closed, the power-saving mode is established. Switching of the mode is achieved by controlling the signal fed out via the terminal PD. Specifically, when, in step #10, a signal that causes the transistor 10 to be turned on is fed out via the terminal PD, the voltage AC1 applied to the primary coil 2a of the step-down transformer 2 drops to 50V, and thus, in step #15, the power-saving mode is established. Next, in step #20, whether the door is open or not is checked. Until the door is opened, the power-saving mode is maintained. When the door is recognized as open, the control flow proceeds to step #25. Similarly, if, in step #5, the door is recognized as open, the control flow proceeds to step #25.

When the door is opened, in the switch 7, the terminals 7a and 7b are connected together, and thus, in step #25, the voltage AC1 applied to the primary coil 2a of the step-down transformer 2 rises to 100 V, causing the relay switch 8a to be turned on. Then, in step #30, the normal mode is established. In the normal mode, the load circuits RL can perform their normal operation.

When food to be heated is placed in the heating chamber and, in step #35, the door is recognized as closed, the timer is made to start counting time at the same time as the door is closed. Then, in step #60, whether a predetermined period of time has elapsed or not is checked. If the predetermined period of time has not elapsed yet, then, in step #40, receipt of a signal designating heating conditions is waited for. If, in step #60, the predetermined period of time has elapsed, then the control flow proceeds to step #65 (described later) to establish the power-saving mode.

When a signal designating heating conditions is received, then, in step #45, receipt of a signal requesting starting of heating is waited for. Then, by key operation by the user in the operation unit 16, signals designating heating conditions and requesting starting of heating are fed to the CPU 6. At this time, the timer, which was made to start counting time in step #35, is made to stop counting time and is reset. If no signal requesting starting of heating is received within a predetermined period of time (set separately from the one used by the timer) after receipt of a signal designating heating conditions, the control flow returns to step #40.

When, in step #45, a signal requesting starting of heating is received, then, in step #50, heating is controlled. Heating is controlled by controlling the operation of a heating member. At the end of the heating time based on the heating conditions, in step #55, heating operation is ended. After the end of heating operation, the user opens the door, then takes the food out of the heating chamber (step #57), and then closes the door (step #58). At the same time as the door is closed this time, the timer is made to start counting time.

If, in step #58, a signal is received before a predetermined period of time has elapsed after the timer was made to start counting time, the user intends to perform cooking continuously, and therefore the control flow proceeds to step #60 and then to step #40. If, in step #60, the predetermined period of time has elapsed after the timer was made to start counting time, the power-saving mode is established. Specifically, a signal that causes the transistor 10 to be turned on is fed out via the terminal PD so as to turn off the transistor 9 and thereby shut off the current to the relay coil 8. Thus, in step #65, the relay switch 8a is turned off. Then, the control flow proceeds to step #10.

In this embodiment, the power-saving mode is normally maintained. This helps reduce the electric power consumed by the load circuits RL and thereby economize electric power. In particular, the voltage difference between the primary coil 2a and the secondary coil 2b of the step-down transformer 2 is smaller in the power-saving mode. This helps reduce iron loss and copper loss occurring in the step-down transformer 2. Moreover, in cases where a means for keeping the voltage fed to the CPU 6 constant, such as the three-terminal voltage regulator 5, is provided, it is also possible to reduce the voltage difference between the input and output of such a means and thereby reduce loss occurring therein.

Moreover, simply by opening the door, it is possible to establish the normal mode to perform heating operation. On completion of heating operation, the power-saving mode is automatically established. Thus, it is possible to securely reduce the electric power consumed in a standby state with minimum hindrance to the operation of the microwave heating apparatus.

Furthermore, even in the power-saving mode, the CPU 6 is kept fed with a small amount of electric power so that display of the current time is conveniently maintained. Even though electric power is consumed in the power-saving mode in this way, the electric power consumed in a standby state is satisfactorily reduced from 2 W, which is typical in a conventional microwave heating apparatus, to about 0.5 W.

Figure 5:
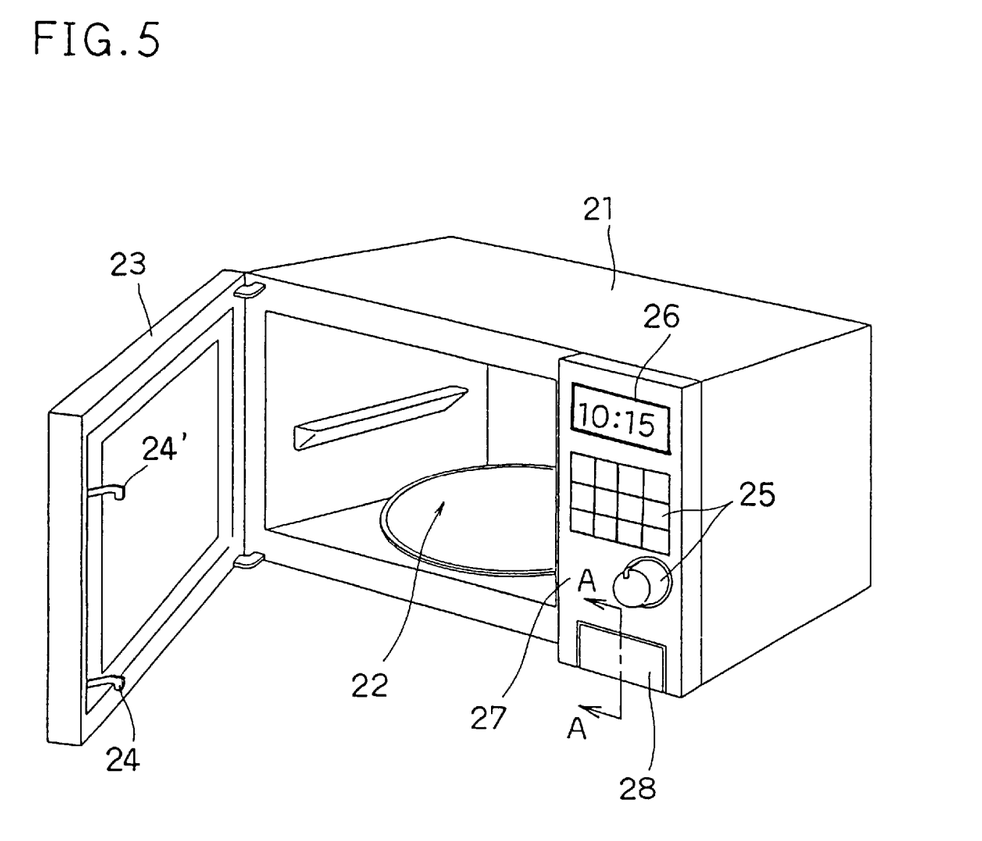
FIG. 5 is an external view of a microwave heating apparatus of a second embodiment of the invention.

FIG. 5 is a perspective external view of the microwave heating apparatus of a second embodiment of the present invention. The microwave heating apparatus has a heating chamber 22 provided inside a body 21. In front of the heating chamber 22, a door 23 is fitted that can be opened and closed freely.

Inside the door 23, latch heads 24 and 24' are provided that are movable upward and downward and that are loaded with a force that tends to move them downward. When the door 23 is closed, the latch heads 24 and 24' are inserted into the body 21 so as to engage with latch hooks (described later), and thereby the door 23 is locked.

On the front surface of the body 21, an operation panel 27 is provided that includes keys 25 and a display unit 26. The keys 25 are used to set a cooking program for heating operation in accordance with cooking conditions, and also to retrieve particular cooking recipe data. The display unit 26 is used to display such cooking conditions and cooking recipe data as well as the current time. In a lower portion of the operation panel 27, a door opening button 28 is provided. When this door opening button 28 is pressed, the latch heads 24 and 24' disengage from the latch hooks so as to allow the door 23 to be opened.

Figure 6:
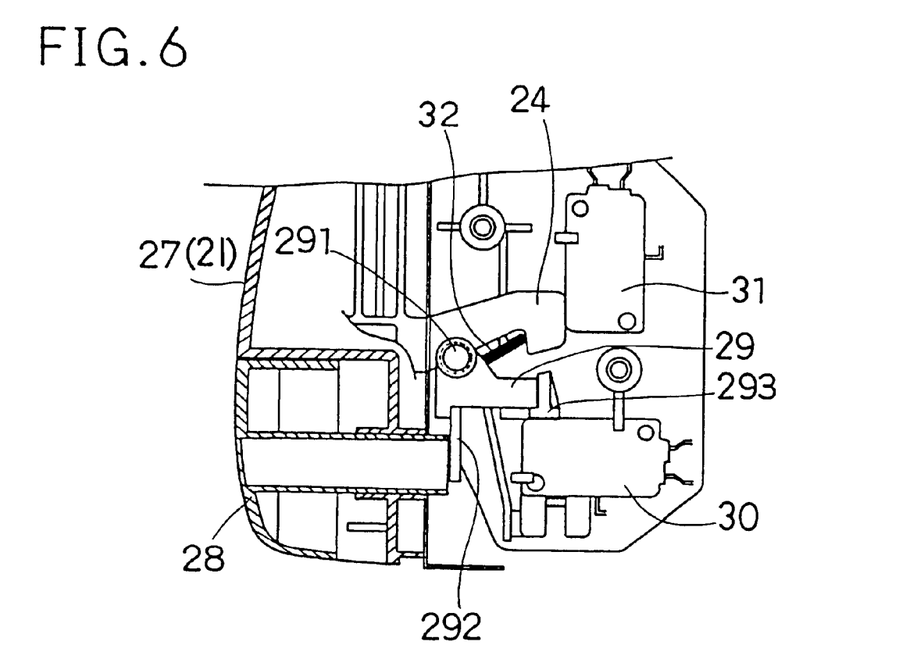
FIG. 6 is a sectional view of a principal portion of the door opening/closing mechanism employed in the second embodiment.

First, the opening/closing mechanism of the door 23 will be described. FIG. 6 is a sectional view of a principal portion of the door opening/closing mechanism, as seen in the direction indicated by the arrows A—A shown in FIG. 5 and as observed in a state in which the door 23 (see FIG. 1) is closed. The door opening button 28, which serves as an operation member, is designed to be slidable back and forth with respect to the operation panel 27 (and the body 21).

A lever-like member 29, which serves as a door opening member, is provided that is rotatable about a shaft 291 and that is loaded with a force that tends to move it clockwise as seen in the figure. A start switch 30 and a door switch 31 each have a knob, though those knobs are not shown in the figure because, in this state, they are both pressed in so as to sink in completely. A latch hook 32 is fixed rigidly to the body 21.

When the door 23 is closed, the lever-like member 29, at a first piece 292 thereof, makes contact with the rear end of the door opening button 28, and, at a second piece 293 thereof, presses the knob of the start switch 30 from above. On the other hand, the latch head 24 of the door 23 is inserted into the body 21 so as to engage with the latch hook 32 and simultaneously press the knob of the door switch 31.

Figure 7:
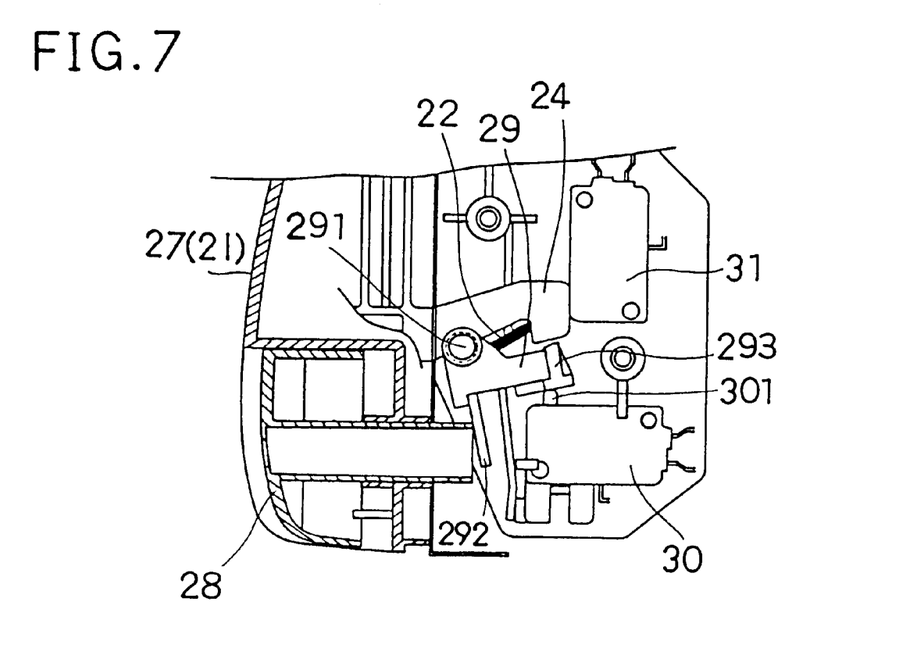
FIG. 7 is a diagram showing a state in which the door opening button is pressed lightly from the state shown in FIG. 6.

FIG. 7 shows a state in which the door opening button 28 is pressed lightly from the state shown in FIG. 6. When the door opening button 28 is pressed against the force with which the lever-like member 29 is loaded, the lever-like member 29, by being pressed at its first piece 292, rotates counter-clockwise as seen in the figure. As a result, the second piece 293 of the lever-like member 29 moves upward and thereby allows the knob 301 of the start switch 30 to stick out. Thus, the contact state of the start switch 30 is switched.

Figure 8:
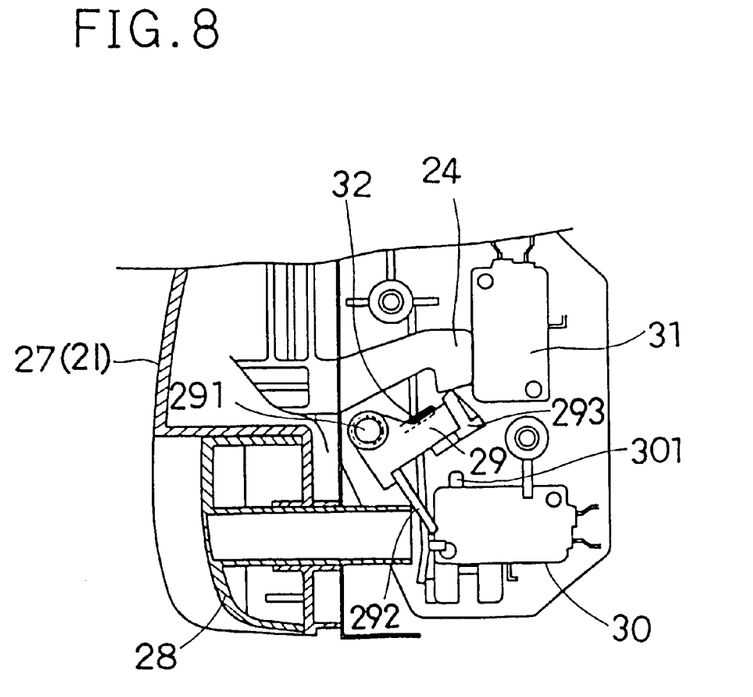
FIG. 8 is a diagram showing a state in which the door opening button is pressed fully from the state shown in FIG. 6.

FIG. 8 shows a state in which the door opening button 28 is pressed fully. The lever-like member 29 rotates further until its second piece 293 makes contact with and then moves upward the latch head 24. As a result, the latch head 24 disengages from the latch hook 32. At this time, the rotation of the lever-like member 29 and the sticking-out movement of the knob of the door switch 31 press the latch head 24 forward, and thus the door 23 is opened.

Figure 9:
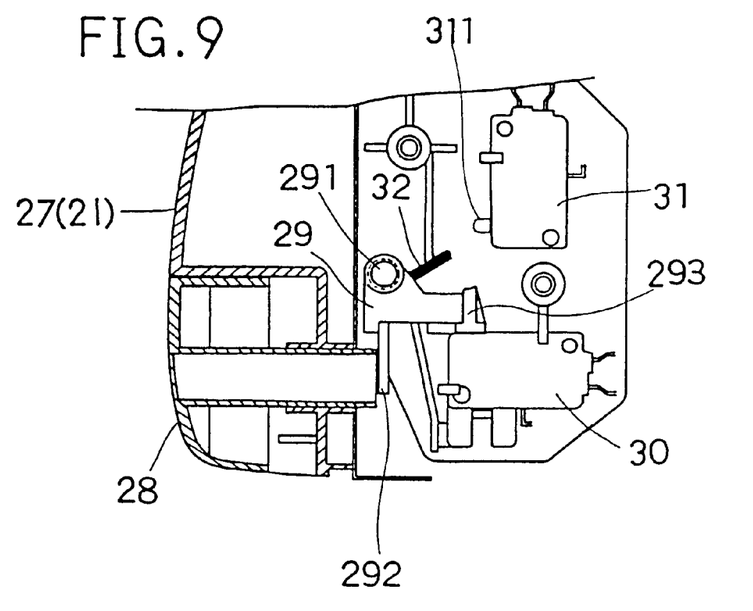
FIG. 9 is a diagram showing a state in which the door is opened from the state shown in FIG. 6.

FIG. 9 shows a state in which the door 23 is opened and the door opening button 28 is released from the pressed state. When the door opening button 28 is released from the pressed state, the lever-like member 29, by being pressed by the force with which it is loaded, rotates clockwise as seen in the figure. As a result, the first piece 292 presses the door opening button 28 back into its original position. At this time, the second piece 293 presses the knob 301 (see FIG. 8) of the start switch 30 to sink it back in. On the other hand, the latch head 24 moves out of the body 21 and thereby allows the knob 311 of the door switch 31 to stick out. Thus, the contact state of the door switch 31 is switched.

As described above, in this embodiment, when the user presses the door opening button 28, the contact state of the start switch 30 is switched, then the latch head 24 disengages from the latch hook 32, and then the contact state of the door switch 31 is switched. Meanwhile, when the latch head 24 disengages from the latch hook 32, the lever-like member 29, at its second piece 293, makes contact with the latch head 24 and then moves it upward, and therefore the user feels a light tactile resistance at that moment.

Accordingly, if the user stops pressing the door opening button 28 when a tactile resistance is felt, it is possible to perform only the switching of the contact state of the start switch 30. In particular, in this embodiment, a certain amount of play is secured between the position in which the lever-like member 29, at its second piece 293, switches the contact state of the start switch 30 and the position in which it makes contact with the latch head 24, it is possible to perform these actions in two clearly separate steps.

Note that, in the microwave heating apparatus of this embodiment, in reality, two latch heads 24 and 24' are provided in a pair as shown in FIG. 5, and correspondingly two door switches and two latch hooks are provided in pairs inside the body 21, although FIGS. 6 to 9 show only the door switch 31 and the latch hook 32 that correspond to one latch head 24. The door switch and the latch hook (neither is shown) that correspond to the other latch head 24' operate in the same manner as the door switch 31 and the latch hook 32 according as the door 23 is opened and closed.

Figure 10:
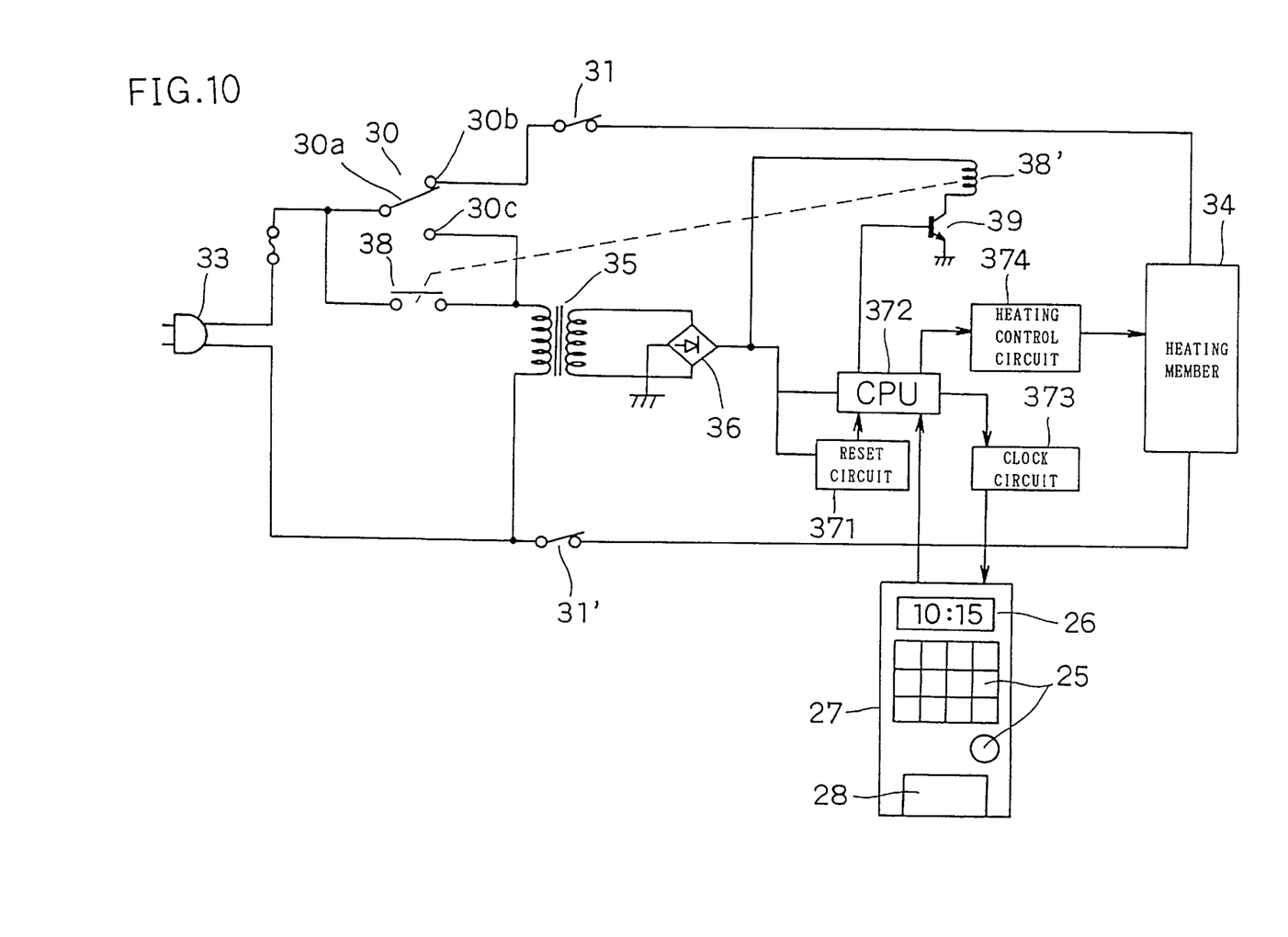
FIG. 10 is a diagram showing the circuit configuration of the second embodiment.

Next, the electric circuitry, which includes the start switch 30 and the door switch 31 mentioned above, of this embodiment will be described. FIG. 10 is a diagram showing the circuit configuration of this embodiment. The circuitry further includes a plug 33 that is connected to commercial alternating-current electric power, a heating member 34 such as a magnetron or heater, a transformer 35, a full-wave rectification circuit 36 for rectifying the output voltage of the transformer 35, a reset circuit 371, a CPU 372 incorporating a timer, a clock circuit 373 controlled by the CPU 372, and a heating control circuit 374 controlled by the CPU 372.

The heating member 34 and the CPU 372 are connected through the start switch 30, which is of a single-throw, two-pole, three-terminal type, to the plug 33. Specifically, the start switch 30 has a moving terminal 30a connected to the plug 33, and has a fixed terminal 30b connected through the door switches 31 and 31' to the heating member 34. Note that the door switch 31' corresponds to the latch head 24' (see FIG. 1).

Moreover, the start switch 30 has a fixed terminal 30c connected through the transformer 35 and the full-wave rectification circuit 36 to the CPU 372. In parallel with this fixed terminal 30c, a relay switch 38 is connected. The relay switch 38 is turned on and off by a relay coil 38' that is connected through a switching transistor 39 to the CPU 372.

Now, the operation of this circuitry, configured as described above, will be described. The circuit configuration shown in FIG. 10 shows a state in which the door 23 is closed. In this state, the contact state of the start switch 30 is such that the moving terminal 30a is connected to the fixed terminal 30b, and the door switches 31 and 31' are on. However, the relay switch 38 is off. Thus, the CPU 372 is not energized, and accordingly the heating member 34, which is controlled and driven by the CPU 372, is not in operation despite being connected to commercial alternating-current electric power.

From this state, when the door opening button 28 in the operation panel 27 is pressed to open the door 23 (see FIG. 1), first the contact state of the start switch 30 is switched as shown in FIG. 7 in the middle of the pressing action. As a result, in FIG. 10, the contact state of the start switch 30 is switched so that the moving terminal 30a is connected to the fixed terminal 30c, and thus electric power is supplied through the transformer 35 and the full-wave rectification circuit 36 to the CPU 372.

When the CPU 372 is energized, first the reset circuit 371 detects a direct-current voltage, and outputs a reset signal to the CPU 372. On receiving the reset signal, the CPU 372 performs program initialization, and then outputs a high-level signal to the base of the switching transistor 39.

As a result, the switching transistor 39 is turned on, and thus a current flows through the relay coil 38', turning the relay switch 38 on. Accordingly, even if thereafter the door opening button 28 is released from the pressed state and the contact state of the start switch 30 is switched back so that the moving terminal 10a is connected to the fixed terminal 30b, the relay switch 38 maintains supply of electric power to the CPU 372.

Next, the door opening button 28 is pressed fully as shown in FIG. 9 to open the door 23, and then the door opening button 28 is released from the pressed state. As a result, in FIG. 10, the door switches 31 and 31' are turned off, and thus the heating member 34 is shut off from commercial electric power. Accordingly, there is no possibility of the heating member 34 being erroneously operated when the door 23 is open.

Moreover, the contact state of the start switch 30 is switched so that the moving terminal 30a is connected to the fixed terminal 30b; however, as described above, the relay switch 38 maintains supply of electric power to the CPU 372. From this state, when the door 23 is closed again, the door switches 31 and 31' are turned on, and thus the heating member 34 is connected to commercial electric power.

In this way, according to the opening/closing mechanism of the door 23 and the circuit configuration of this embodiment, when the door opening button 28 is pressed halfway, the CPU 372 is energized, and, when the door opening button 28 is pressed fully, the door 23 is opened. When the once opened door 23 is closed again, the heating member 34, too, is energized and thus becomes ready for heating operation under the control of the CPU 372.

In the electric circuitry of this embodiment described above, the relay switch 38 may be realized by the use of a semiconductor switch. In that case, there is no need to provide the relay coil 38'. In cases where the heating member 34 and the CPU 372 operate on separate power sources, the power source for the CPU 372 may be realized by the use of a battery.

The start switch 30 may be of a two-terminal type. However, using a switch of a single-throw, two-pole, three-terminal type as in this embodiment offers the following advantage. Specifically, when the door opening button 28 is erroneously pressed during heating operation, first the contact state of the switch 30 is switched so that the moving terminal 30a is disconnected from the fixed terminal 30b and connected to the fixed terminal 30c, and thereby supply of electric power to the heating element 34 is shut off. Accordingly, when the door 23 is opened thereafter, the heating member 34 is already deactivated. This makes it less likely that a human body will be exposed to microwaves than in conventional microwave heating apparatuses, where the heating member 34 is deactivated by the door switches 31 and 31' at the same time as the door 23 is opened.

Now, the heating operation of this microwave heating apparatus, configured as described above, will be described. First, the user inserts the plug 33 into an outlet of commercial alternating-current electric power, and then presses the door opening button 28 to open the door. As described previously, in the middle of the pressing action of the door opening button 28, the contact state of the start switch 30 is switched so that the CPU 372 is energized and then initialized.

Figure 11:
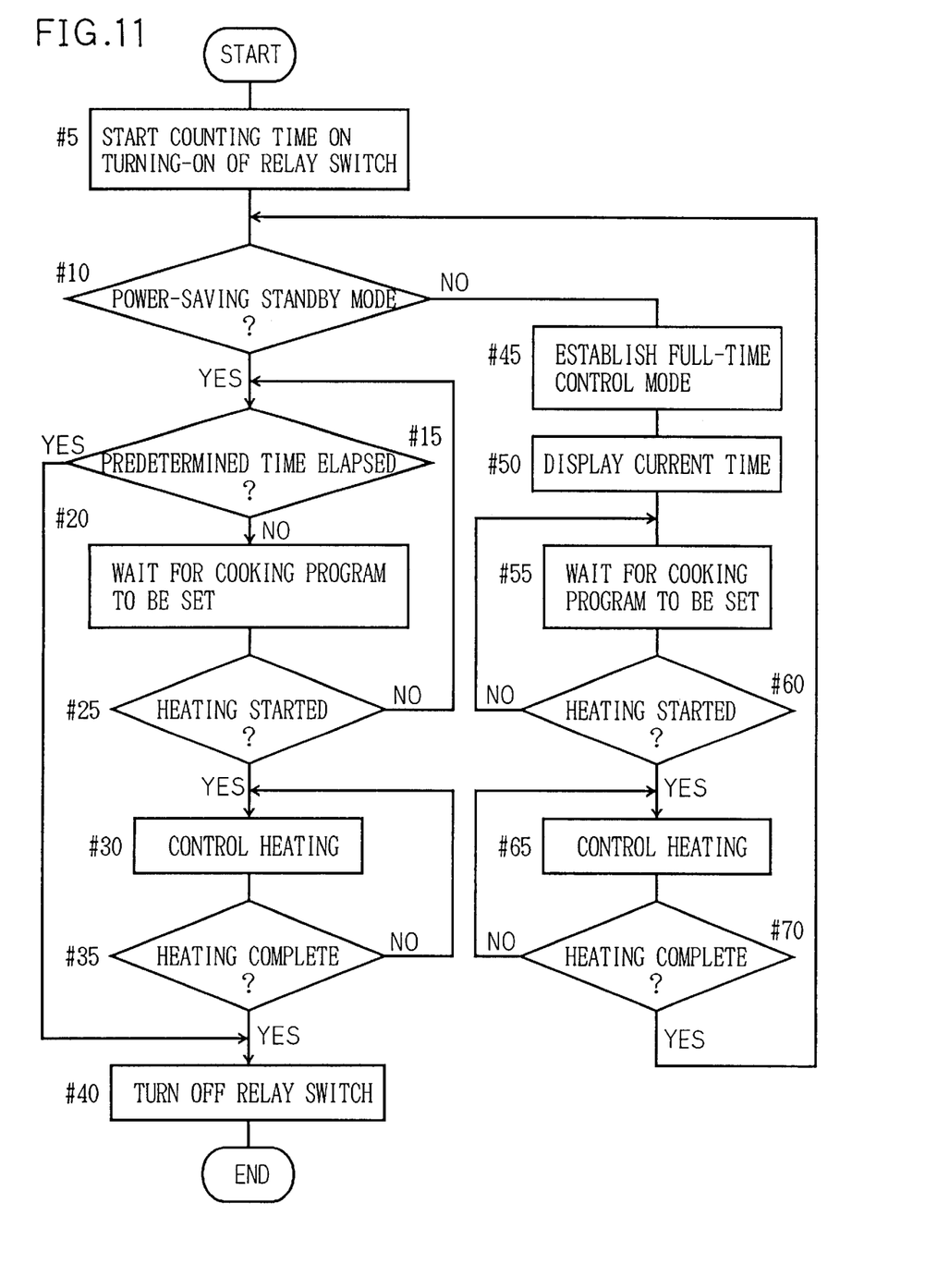
FIG. 11 is a flow chart of the second embodiment.

FIG. 11 shows the control flow of the CPU 372. This control flow is started when the CPU 372 is initialized. First, in step #5, the relay switch 38 is turned on, and thereby supply of electric power to the CPU 372 is secured. In addition, the timer incorporated in the CPU 372 starts counting a predetermined period of time.

In step #10, whether a power-saving standby mode is established or not is checked. The microwave heating apparatus of this embodiment operates either in a full-time control mode in which electric power is supplied to the CPU 372 constantly or in a power-saving standby mode in which no electric power is supplied to the CPU 372 unless heating operation is performed. The CPU 372 stores in a non-volatile memory (EEPROM) the mode that was established when it was energized last time so that it can automatically restore that mode when initialized. The mode can be switched by operating the keys 25 (see FIG. 1) to suit the way in which the microwave heating apparatus is used.

If, in step #10, the power-saving standby mode is recognized as established, then, in step #15, whether a predetermined period of time has elapsed or not is checked. If the predetermined period of time has not elapsed yet, the control flow proceeds to step #20. In this step #20, the CPU 372 waits for the user to set a cooking program. That is, at this time point, the user has already placed food inside the heating chamber 22 and closed the door 23, and now the user is going to set a cooking program by operating the keys 25.

Next, in step #25, whether starting of heating operation is requested or not is checked. When the user, after setting a cooking program, further operates the keys 25 to request starting of heating operation, the control flow proceeds to step #30. At this time, the door 23 is closed, and therefore the heating member 34 is connected to commercial alternating-current electric power, ready to be driven. When the control flow proceeds to step #30, the timer is made to stop counting time.

In step #30, the heating member 34 is driven and controlled through the heating control circuit 374 so that heating operation is performed in accordance with the cooking program. Then, in step #35, whether heating operation is complete or not is checked. On completion of heating operation, in step #40, the relay switch 38 is turned off. Accordingly, supply of electric power to the CPU 372 is shut off, and the control flow comes to an end.

Similarly, also if, in step #15, the predetermined period of time has elapsed without the user requesting starting of heating operation in step #25, the control flow proceeds to step #40, and supply of electric power to the CPU 372 is shut off. The predetermined period of time counted by the timer is determined in such a way as to allow the user sufficient time to request starting of heating operation.

For example, in a case where the user only wishes to confirm certain cooking data or cooking recipe data without performing heating operation for cooking, the user operates the keys 25 simply to display such data on the display unit 26 and does not request starting of heating operation. In such a case, the user is allowed sufficient time to view such data before the predetermined period of time elapses, and only thereafter supply of electric power to the CPU 372 is shut off.

By contrast, if, in step #10, the power-saving standby mode is not recognized as established, the full-time control mode is established (step #45). Then, in step #50, the current time is displayed on the display unit 26 through the clock circuit 373. Then, in steps #55 to #70, the same operations as in the power-saving standby mode are performed. Specifically, if the user wishes to perform heating operation for cooking, the user needs to have placed food inside the heating chamber 22 and closed the door 23 in advance; then, the user operates the keys 25 to set a cooking program (step #55).

Since the door 23 is closed, the heating member 34 is connected to commercial alternating-current electric power, ready to be driven. Accordingly, if, in step #60, starting of heating operation is requested by operation of the keys 25, then, in step #65, heating operation is performed in accordance with the cooking program. When the control flow proceeds to step #65, the timer is made to stop counting time. Thereafter, when, in step #70, heating operation is complete, the control flow returns to step #10. Thus, in the full-time control mode, electric power is supplied constantly to the CPU 372, and the current time is displayed on the display unit 26 even while no heating operation is being performed.

As described above, in the microwave heating apparatus of this embodiment, in the power-saving standby mode, no electric power is supplied to the CPU 372 or other circuits unless heating operation is performed, and thus no electric power is consumed in a standby state.

Moreover, in the power-saving standby mode, simply by opening the door, the CPU 372 starts being supplied with electric power so as to be ready to perform heating operation, and, on completion of heating operation, the power-saving standby mode is established automatically. Thus, it is possible to securely reduce the electric power consumed in a standby state with minimum hindrance to the operation of the microwave heating apparatus.

Furthermore, in a case where the user only wishes to confirm cooking data or cooking recipe data without performing heating operation for cooking, simply by pressing the door opening button 28 halfway, the CPU 372 is energized. Thus, it is possible to eliminate the need to perform an extra step of opening the door once as in conventional microwave heating apparatuses, and thereby achieve enhanced user-friendliness.

Figure 12:
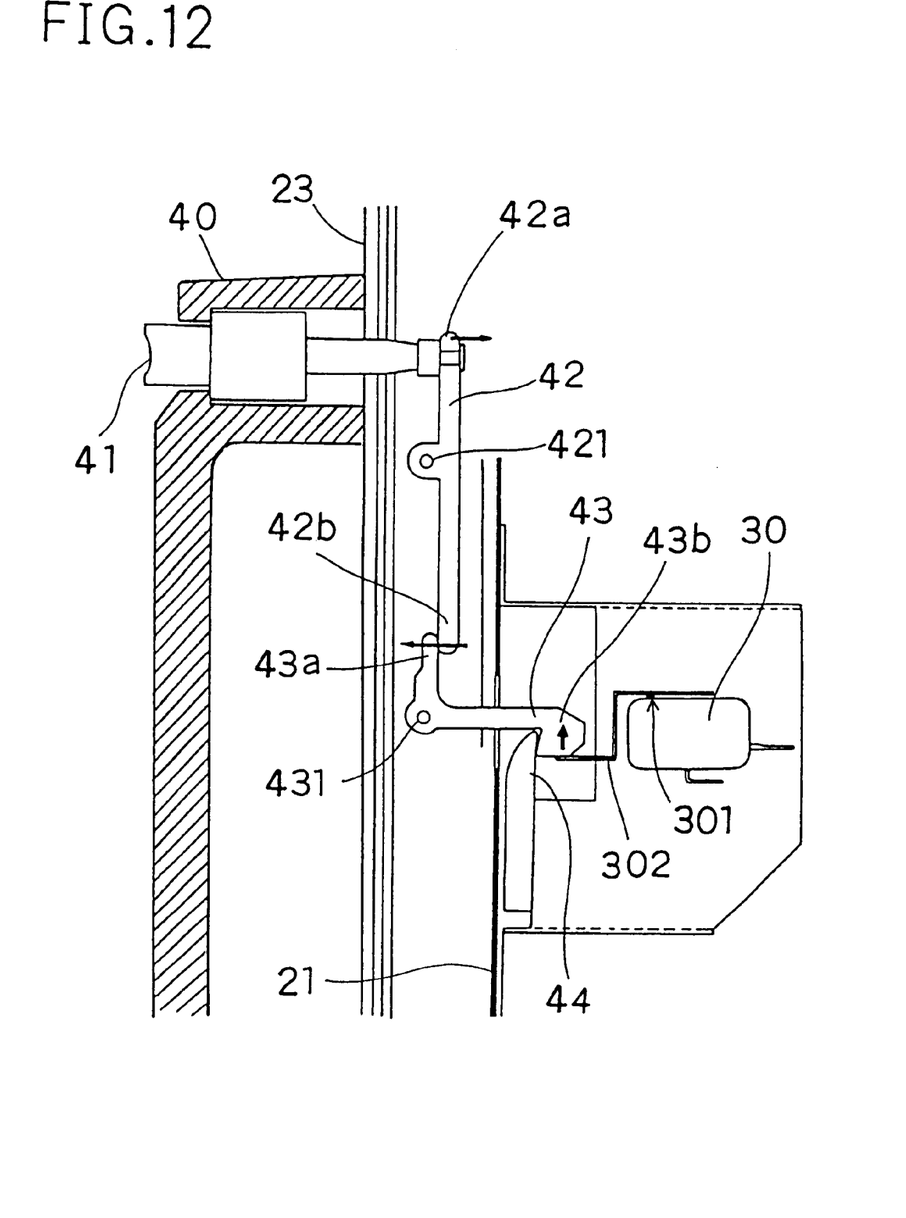
FIG. 12 is a sectional view of a principal portion of another example of the door opening/closing mechanism employed in the second embodiment.

Next, another example of the opening/closing mechanism, having a different structure from the one described above, of the door 23 for the microwave heating apparatus of this embodiment will be described. In other respects, the microwave heating apparatus provided with this opening/closing mechanism of the door 23 has the same configuration and operates in the same manner as the microwave heating apparatus of the second embodiment.

FIG. 12 is a sectional view of this opening/closing mechanism. A door handle 40 is provided on the door 23. The door handle 40 has, in an upper portion thereof, a door opening button 41 fitted so as to be slidable back and forth. Inside the door 23, a latch lever 42 is provided that is rotatable about a shaft 421 and that is loaded with a force that tends to rotate it counter-clockwise as seen in the figure. This latch lever 42 is, at one end 42a, fitted to the rear end of the door opening button 41.

A latch head 43 is provided so as to be rotatable about a shaft 431. The latch head 43 is, at one end 43a, placed in contact with the other end 42b of the latch lever 42, and is, at the other end 43b, formed into a claw that protrudes from the door 23. A latch hook 44 is fixed rigidly to the body 21 so as to engage with the claw portion 43b of the latch head 43 inserted into the body 21.

According to this structure, the user first holds the upper portion of the door handle 40 and presses the door opening button 41 with a finger. This causes the door opening button 41 to move backward. At this time, since one end 42a of the latch lever 42 is fixed to the rear end of the door opening button 41, the latch lever 42 rotates clockwise about the shaft 421. Accordingly, the other end 42b of the latch lever 42 presses one end 43a of the latch head 43, and thus the latch head 43 rotates counter-clockwise about the shaft 431. As a result, the claw portion 43b of the latch head 43 moves upward.

The lower surface of the claw portion 43b of the latch head 43 makes contact with one end of the knob lever 302 of the start switch 30. As shown in FIG. 12, when the door opening button 41 is not pressed, the knob 301 of the start switch 30 is pressed by the knob lever 302 so as to sink in completely.

When the claw portion 43*b* of the latch head 43 moves upward, the knob lever 302 rotates clockwise and thereby allows the knob 301 to stick out. Thus, the contact state of the start switch 30 is switched. At this time, the claw portion 43*b* of the latch head 43 still remains engaged with the latch hook 34. When the door opening button 41 is pressed further, the claw portion 43*b* moves further upward and then disengages from the latch hook 34.

Although the door switch 31 is not shown here, it may be arranged in any way as long as it is fitted inside the body in such a way as to allow its contact state to be switched according as the door 23 is opened and closed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A microwave heating apparatus comprising:
   a load;
   a control circuit for controlling and driving the load;
   a power source for supplying electric power to the load and the control circuit; and
   a transformer for stepping down a voltage of the electric power supplied from the power source to the load and the control circuit,
      wherein the microwave heating apparatus is operable in at least a first mode and a second mode, wherein the second mode is a standby mode where a relatively small amount of electric power is supplied to the load and the control circuit as compared with the first mode,
      wherein a voltage applied to a primary coil of the transformer is lower in the second mode than in the first mode, and
      wherein upon completion of a heating operation, the second mode is automatically established.

2. A microwave heating apparatus as claimed in claim 1, wherein the primary coil of the transformer is connected through a resistor to the power source when the apparatus is in the second mode.

3. A microwave heating apparatus as claimed in claim 1, wherein a voltage high enough to perform a heating operation is applied to the primary coil of the transformer when the apparatus is in the first mode.

4. The apparatus of claim 1, further comprising a step down transformer for stepping down voltage of the supplied electric power, wherein voltage differences between primary and secondary coils in the standby mode is smaller than in the power mode to reduce iron and copper loss in the transformer.

5. A microwave heating apparatus as claimed in claim 1, wherein the load includes a clock display unit, which maintains display regardless of switching between the first and second modes.

6. A microwave heating apparatus as claimed in claim 1, wherein the control circuit, when it detects the door being closed in the first mode, starts counting a predetermined period of time, and, unless it receives a signal before it finishes counting the predetermined period of time, automatically switches to the second mode.

7. A microwave heating apparatus as claimed in claim 1, further comprising:
   a first switch of a single-throw, two-pole, three-terminal type having a first terminal connected to the power source, having a second terminal connected to a primary coil of the transformer, and having a third terminal connected through a resistor to the primary coil of the transformer; and
   a door fitted so as to shut a heating chamber in which to place food,
      wherein, when the door is opened, the first terminal is connected to the second terminal and, when the door is closed, the first terminal is connected to the third terminal.

8. A microwave heating apparatus as claimed in claim 7, further comprising:
   a second switch connected in parallel with the resistor, the second switch being turned on when the door is opened.

9. A microwave heating apparatus as claimed in claim 8, wherein the control circuit, when it detects the door being closed while the second switch is on, starts counting a predetermined period of time, and, unless it receives a signal before it finishes counting the predetermined period of time, turns off the second switch.

10. The apparatus of claim 1, wherein electric power supplied in the standby mode includes power for powering display of the current time on a display of the apparatus.

11. The apparatus of claim 1, wherein the voltage ultimately fed to the load is constant, regardless of the apparatus being in a standby or power mode.

12. A method of operating a microwave apparatus having a power source supplying electric power to a load and a control circuit for driving the load, comprising:
   determining whether a door enclosing a heater chamber in which food is placed has been opened;
   feeding a first voltage to a step down transformer if the door is closed, thereby instituting a standby mode wherein a relatively small first voltage is fed; and
   enabling a second voltage, relatively greater than said first voltage, to be sent to the step down transformer when it is determined that the door has been opened, thereby establishing a power mode in which a heating operation can be performed, if desired.

13. The method of claim 12, further comprising initializing a counter to begin counting a predetermined time on closure of the door at the moment the power mode is established, wherein if the predetermined time is elapsed, operation automatically switches from the power to the standby mode.

14. The method of claim 13, wherein said counting to said predetermined time allows a user sufficient time to input at least one of heating conditions and instructions before closing the door, if desired.

15. The method of claim 12, wherein after said heating operation is completed and the door is opened to remove food, a counter is initialized to begin counting a predetermined time on closure of the door at the moment the power mode is established, wherein if the predetermined time is elapsed, operation automatically switches from the power to the standby mode.

16. The method of claim 13, wherein after said heating operation is completed and the door is opened to remove food, the counter is reset to begin counting to the predetermined time on door closure, and
   wherein, if the predetermined time has elapsed, operation automatically switches from the power to the standby mode to conserve electric power.

* * * * *